United States Patent
Yang et al.

(10) Patent No.: US 10,654,151 B2
(45) Date of Patent: May 19, 2020

(54) WELDING FIXTURE AND WELDING METHOD USING WELDING FIXTURE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Guangzhao Yang, Beijing (CN); Tianxiao Zhao, Beijing (CN); Ruifeng Yang, Beijing (CN); Zijian Wang, Beijing (CN); Libao Cui, Beijing (CN); Yufeng Du, Beijing (CN); Huaxu Yang, Beijing (CN); Chaochao Wang, Beijing (CN); Litao Fan, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 153 days.

(21) Appl. No.: 15/678,019

(22) Filed: Aug. 15, 2017

(65) Prior Publication Data
US 2018/0071896 A1 Mar. 15, 2018

(30) Foreign Application Priority Data
Sep. 9, 2016 (CN) .......................... 2016 1 0812226

(51) Int. Cl.
*B25B 11/00* (2006.01)
*G02F 1/1333* (2006.01)
(Continued)

(52) U.S. Cl.
CPC ........ *B25B 11/002* (2013.01); *B23K 37/0452* (2013.01); *B23K 37/0461* (2013.01);
(Continued)

(58) Field of Classification Search
CPC .............. B25B 11/002; B23K 37/0452; B23K 37/0461; B23K 37/0435; B23K 2101/36;
(Continued)

(56) References Cited

U.S. PATENT DOCUMENTS 2,186,708 A * 1/1940 Richardson ........ B23K 37/0461
269/51
6,420,679 B1 * 7/2002 Mierczynski .......... B23K 26/10
219/121.82
(Continued)

FOREIGN PATENT DOCUMENTS

CN 201242629 Y 5/2009
CN 102760382 A 10/2012
(Continued)

OTHER PUBLICATIONS

First Chinese Office Action dated May 2, 2017, for corresponding Chinese Application No. 201610812226.0.
(Continued)

*Primary Examiner* — Orlando E Aviles
*Assistant Examiner* — Seahee Yoon
(74) *Attorney, Agent, or Firm* — Kinney & Lange, P.A.

(57) ABSTRACT

An embodiment of the present disclosure provides a welding fixture, including: a base; a supporter; a fixing device arranged to fix a member to be welded on the supporter; and a damping hinge which includes a first hinge plate, a second hinge plate and a pivot, the first hinge plate being fixed to the base, the second hinge plate being fixed to the supporter, wherein each of the first hinge plate and the second hinge plate has a pivot hole and is connected to the pivot via the pivot hole, and wherein the pivot is fitted into the pivot hole of each of the first hinge plate and the second hinge plate by interference. An embodiment of the present disclosure provides a welding method using the welding fixture.

6 Claims, 10 Drawing Sheets

(51) Int. Cl.
*G02F 1/13* (2006.01)
*B23K 37/04* (2006.01)
*B23K 101/36* (2006.01)

(52) U.S. Cl.
CPC ........ *G02F 1/1333* (2013.01); *B23K 2101/36* (2018.08); *G02F 1/1303* (2013.01)

(58) Field of Classification Search
CPC ..... G02F 1/1333; G02F 1/1303; B23Q 3/154; B23Q 3/1543
USPC .............................................. 269/74, 8, 276
See application file for complete search history.

(56) References Cited

U.S. PATENT DOCUMENTS

| | | | |
|---|---|---|---|
| 2002/0038930 A1* | 4/2002 | Leon, Jr. .................. | B23K 9/32 269/8 |
| 2002/0121506 A1* | 9/2002 | Menin .................... | B23K 26/10 219/121.64 |
| 2002/0130111 A1* | 9/2002 | Menin .................... | B23K 26/10 219/121.63 |
| 2006/0065651 A1* | 3/2006 | Zhang ................ | B23K 26/0861 219/121.86 |
| 2009/0189324 A1* | 7/2009 | Wong .................. | B23Q 3/1546 269/8 |
| 2010/0213657 A1* | 8/2010 | Sladojevic ............ | B25B 11/002 269/8 |
| 2014/0223691 A1* | 8/2014 | Cheng ....................... | E05F 5/08 16/50 |
| 2016/0023440 A1* | 1/2016 | Irazu Echeverria .... | B32B 15/08 428/213 |
| 2016/0078989 A1* | 3/2016 | Underwood .............. | H01F 7/04 335/285 |

FOREIGN PATENT DOCUMENTS

| | | |
|---|---|---|
| CN | 204090332 U | 1/2015 |
| CN | 104785879 A | 7/2015 |
| CN | 204603636 U | 9/2015 |
| CN | 204657697 U | 9/2015 |
| CN | 205531860 U | 8/2016 |
| KR | 20000007566 A | 2/2000 |

OTHER PUBLICATIONS

Third Chinese Office Action, for Chinese Patent Application No. 201610812226.0, dated Nov. 27, 2017, 14 pages.

Chinese Search Report, for Chinese Patent Application No. 201610812226.0, dated Feb. 16, 2017, 10 pages.

* cited by examiner

WELDING FIXTURE AND WELDING METHOD USING WELDING FIXTURE

CROSS-REFERENCE TO RELATED APPLICATION

This application claims benefit of the Chinese Patent Application No. 201610812226.0, filed with SIPO on Sep. 9, 2016, which is incorporated herein by reference in entirety.

BACKGROUND OF THE DISCLOSURE

Field of the Disclosure

The present disclosure relates to the field of mechanical manufacturing, in particular to a welding fixture and a welding method using the welding fixture.

Description of the Related Art

In the field of mechanical manufacturing, it is generally necessary to fix a member to be welded on a welding fixture to perform welding operation. For example, during manufacturing a liquid crystal display module, it is necessary to arrange the assembled liquid crystal display module on the welding fixture for welding. The liquid crystal display module is characterized by having a similar product structure but being of different product sizes.

Different types of liquid crystal display module need different welding angles. Thus, it is desired to customize a specialized welding fixture for each type of liquid crystal display module, which increases production cost and production period of the liquid crystal display module.

SUMMARY

In order to alleviate above issues, in an aspect, an embodiment of the present disclosure provides a welding fixture, comprising:
  a base;
  a supporter arranged on the base;
  a fixing device arranged to fix a member to be welded on the supporter; and
  a damping hinge which comprises a first hinge plate, a second hinge plate and a pivot, the first hinge plate being fixed to the base, the second hinge plate being fixed to the supporter, wherein each of the first hinge plate and the second hinge plate has a pivot hole and is connected to the pivot via the pivot hole, and wherein the pivot is fitted into the pivot hole of each of the first hinge plate and the second hinge plate by interference.

In an embodiment, the fixing device is a magnetic fixing device, and an iron member is provided in the supporter, and wherein the magnetic fixing device is arranged such that it is pulled firmly onto the iron member of the supporter by a magnetic force in a first state and it is disengaged from the iron member of the supporter by removing the magnetic force in a second state.

In an embodiment, the magnetic fixing device comprises a housing and a rotatable magnet arranged within the housing, the housing comprising two magnetic conductors and a copper plate arranged between the two magnetic conductors. In an embodiment, the magnetic fixing device further comprises a knob connected to the magnet to drive the magnet to rotate.

In an embodiment, the magnetic fixing device comprises an electromagnet and a retractable shaft which has one end connected to the electromagnet and the other end connected to the base. In an embodiment, the magnetic fixing device further comprises a switch provided on the base and configured to control the electromagnet to be energized or de-energized.

In an embodiment, the welding fixture is configured to weld a liquid crystal display module.

In another aspect, an embodiment of the present disclosure also provides a welding method using the welding fixture, the method comprising steps of:
  placing a member to be welded on a supporter of the welding fixture;
  positioning the member to be welded firmly onto the supporter;
  rotating the supporter to a desired welding angle;
  welding the member; and
  taking away the welded member.

In an embodiment, the step of positioning the member to be welded firmly onto the supporter comprises:
  selecting a fixing position depending on a size of the member to be welded; and
  arranging the fixing device at the fixing position and fixing the member to be welded firmly onto the supporter with the fixing device.

In an embodiment, the member to be welded is a liquid crystal display module to be welded

DETAILED DESCRIPTION

Figure 1:
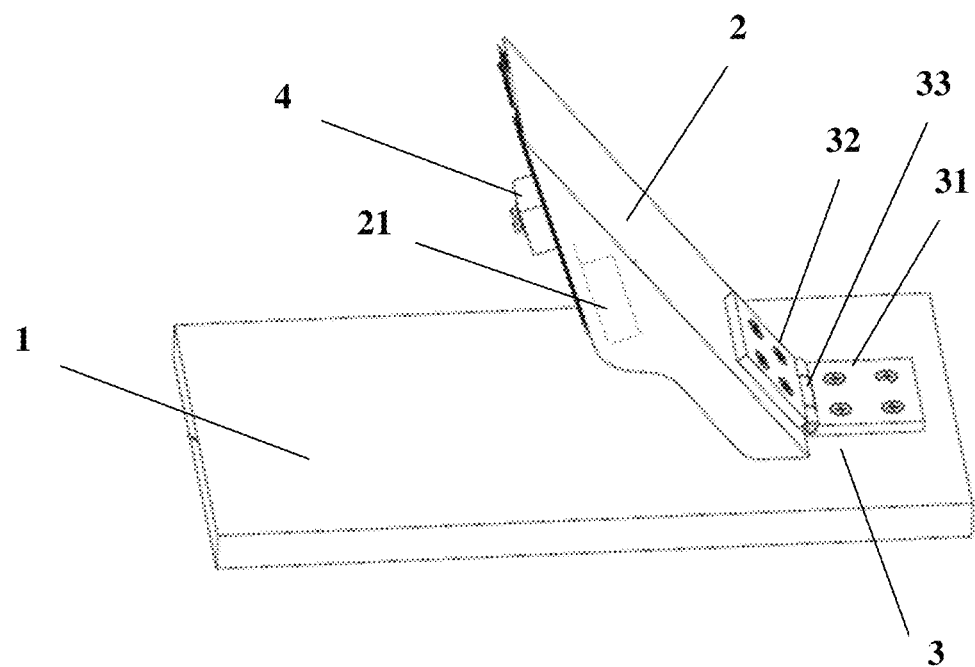
FIG. 1 is a perspective view showing a welding fixture according to an embodiment of the present disclosure.
Figure 2:
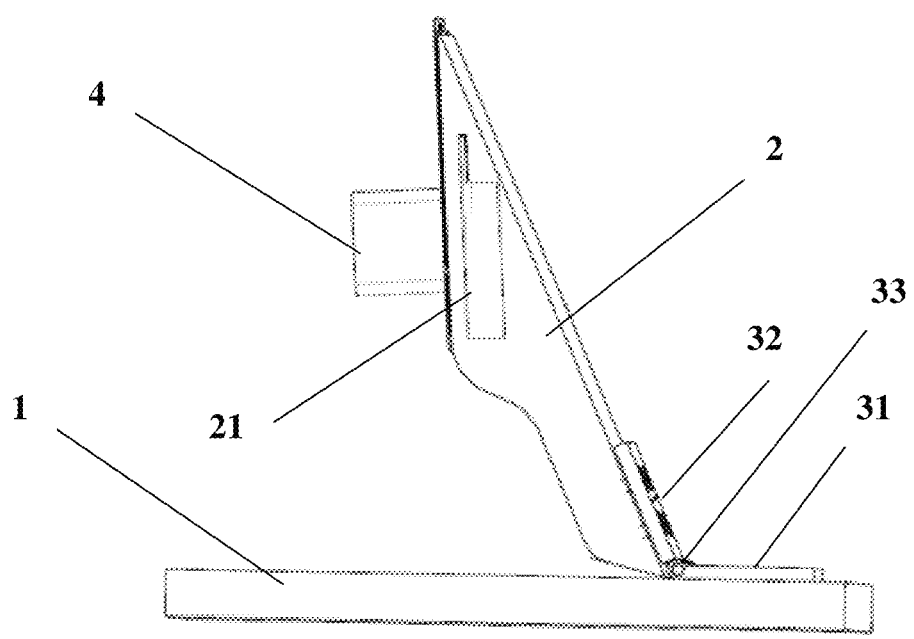
FIG. 2 is a front view showing the welding fixture shown in FIG. 1.

Below, the welding fixture and the welding method using the welding fixture according to embodiments of the present disclosure will be described with reference to drawings. In the following description, many details are described such that the skilled person in the art may know embodiments of the present disclosure comprehensively. However, as appreciated by the skilled person in the art, embodiments of the present disclosure may be implemented without some of these details. Furthermore, it should be understood that the embodiments of the present disclosure are not limited to the described special embodiments. In contrast, the present disclosure may be implemented by any combinations of the following features and elements, regardless of whether these features and/or elements belong to different embodiments or not. Therefore, the following aspects, features, embodiments and advantages are given only for intention of explanation, instead of being regarded as elements or limitations of claims unless they are expressed explicitly in claims.

As shown in FIGS. 1-6, the welding fixture according to an embodiment of the present disclosure includes: a base 1, a supporter 2, a damping hinge 3 and a first magnetic fixing device 4.

The base 1 is configured to provide support for other members of the welding fixture and a liquid crystal display module to be welded.

The supporter 2 is provided with an iron member 21 therein. The supporter 2 is generally made of plastic. The iron member 21 may be inserted in a preset groove within the supporter.

The damping hinge 3 includes a first hinge plate 31, a second hinge plate 32 and a pivot 33. The first hinge plate 31 is fixed to the base 1. The second hinge plate 32 is fixed to the supporter 2. Each of the first hinge plate 31 and the second hinge plate 32 has a pivot hole and is connected to the pivot 33 via the pivot hole. The pivot 33 is fitted into the pivot hole of each of the first hinge plate 31 and the second hinge plate 32 by interference. Due to the interference fit between the pivot and the pivot hole on the hinge plate of the damping hinge, there is a certain friction force between the pivot hole and the pivot. The friction force may be counteracted by applying an external force (for example, a force applied to the supporter manually by an operator) such that the supporter may rotate with respect to the base. After the external force is removed, the friction force may prevent the hinge plate of the damping hinge from rotating freely, such that the supporter may stop with respect to the base and may be remained at a selected angle. Thus, by means of the damping hinge 3, the supporter 2 may rotate with respect to the base 1 and may stop at any suitable angles to be adapted to the welding angles of various types of the liquid crystal display modules, so as to achieve welding various types of the liquid crystal display modules using the universal welding fixture.

The first magnetic fixing device 4 is arranged such that it is pulled firmly onto the iron member 21 of the supporter 2 by a magnetic force in a first state and it is disengaged from the iron member 21 of the supporter 2 by removing the magnetic force in a second state. By adjusting the position of the first magnetic fixing device 4, various types of the liquid crystal display modules with different sizes may be pulled onto the supporter 2, so as to achieve welding the various types of the liquid crystal display module using the universal welding fixture.

Figure 3A:
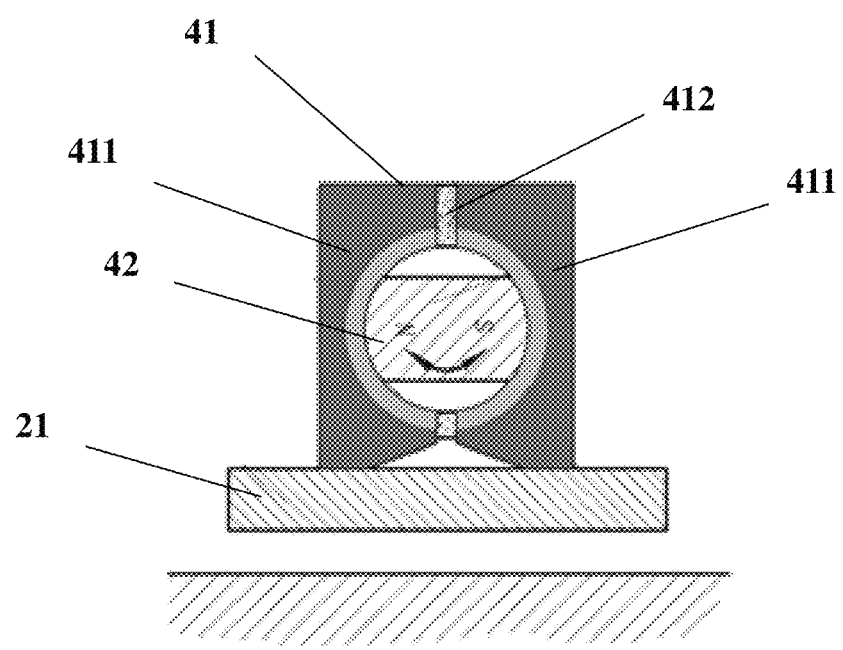
FIG. 3A and FIG. 3B show internal structure of a magnetic fixing device of the welding fixture shown in FIG. 1.
Figure 3B:
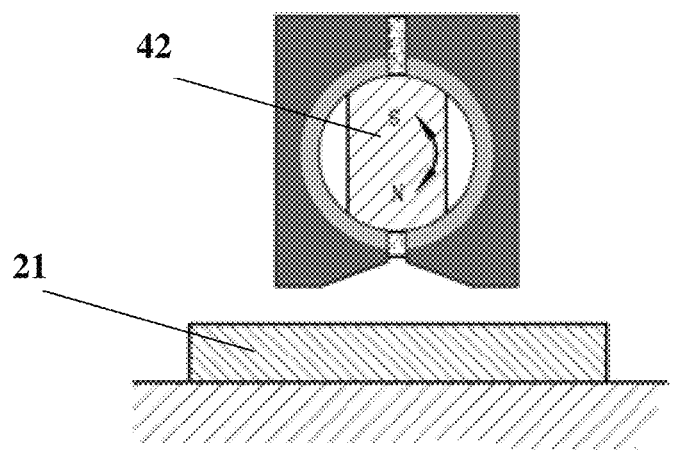

Optionally, as shown in FIG. 3A and FIG. 3B, the first magnetic fixing device 4 comprises a housing 41 and a rotatable magnet 42 arranged within the housing 41. The housing 41 comprises two magnetic conductors 411 and a copper plate 412 arranged between the two magnetic conductors 411. The magnet 42 has an n-pole and a s-pole. The magnet 42 may be a permanent magnet. When the n-pole and the s-pole of the magnet 42 are rotated to a horizontal position as shown in FIG. 3A, the n-pole and the s-pole of the magnet 42 face towards the two magnetic conductors 411 respectively. At that time, magnetic field loops are formed from the n-pole of the magnet 42 to the s-pole of the magnet 42 via one magnetic conductor, the iron member 21 of the supporter and the other magnetic conductor sequentially, such that a magnetic force is formed between the magnet 42 and the iron member 21 of the supporter to cause the magnet 42 to be pulled firmly onto the iron member 21 of the supporter. When the n-pole and the s-pole of the magnet 42 are rotated to the upper and lower positions as shown in FIG. 3B, close magnetic field loops are formed in the two magnetic conductors 411. In such state, magnetic force cannot be formed between the magnet 42 and the iron member 21 of the supporter. The first magnetic fixing device 4 may be taken away from the iron member 21 easily.

Figure 4:
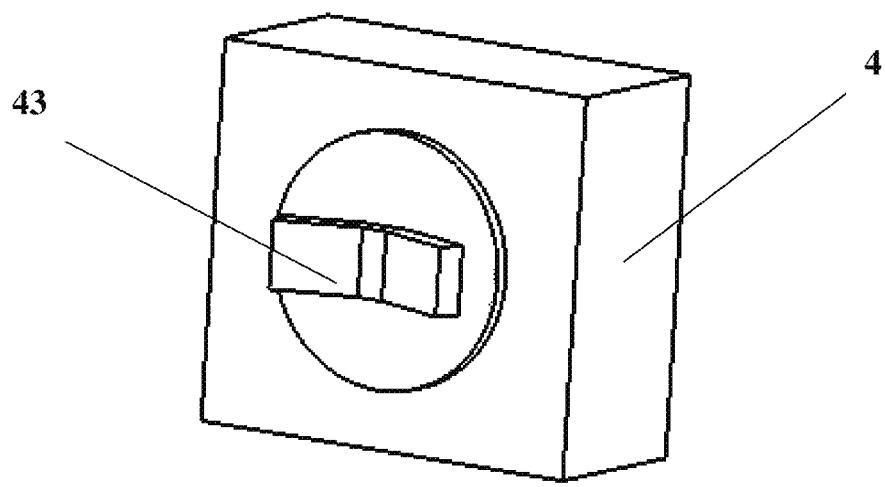
FIG. 4 shows the magnetic fixing device of the welding fixture shown in FIG. 1.

Optionally, as shown in FIG. 4, the first magnetic fixing device 4 comprises a knob 43 connected to the magnet 42 to drive the magnet 42 to rotate.

FIGS. 7 to 10 show the welding fixture according to another embodiment of the present disclosure, the components of which are same to those of the welding fixture according to the embodiment of the present disclosure as shown in FIGS. 1 to 6, except that a second magnetic fixing device 5 in the another embodiment of the present disclosure as shown in FIGS. 7 to 10 replaces the first magnetic fixing device 4 in the embodiment of the present disclosure as shown in FIGS. 1 to 6. Thus, only the second magnetic fixing device 5 in the another embodiment of the present disclosure will be described below.

As shown in FIGS. 7 to 10, the second magnetic fixing device 5 comprises an electromagnet 51, a retractable shaft 52 and a switch 53. The retractable shaft 52 has one end connected to the electromagnet 51 and the other end connected to the base 1. The switch 53 is provided on the base 1 and configured to control the electromagnet 51 to be energized or de-energized. When the electromagnet 51 is energized, the electromagnet 51 produces a magnetic force, so as to be pulled onto the iron member 21 of the supporter. When the electromagnet 51 is de-energized, the electromagnet 51 cannot produce the magnetic force, such that it may be moved away from the supporter easily. The retractable shaft 52 is provided with wires therein to supply power to the electromagnet. The retractable shaft 52 is retractable such that the position of the electromagnet 51 may be adjusted. After the electromagnet 51 is pulled onto the supporter, the retractable shaft 52 may be extended or retracted as the supporter 2 rotates, so as to prevent the rotation of the supporter 2 from being affected by the retractable shaft 52.

The skilled person in the art will appreciate that non-magnetic fixing devices may also be used to fix the liquid crystal display module as required although FIGS. 1 to 6 and 7 to 10 show the liquid crystal display module is fixed by different types of the magnetic fixing devices on the supporter 2. These variants will fall within protection scope of the present disclosure.

Figure 5:
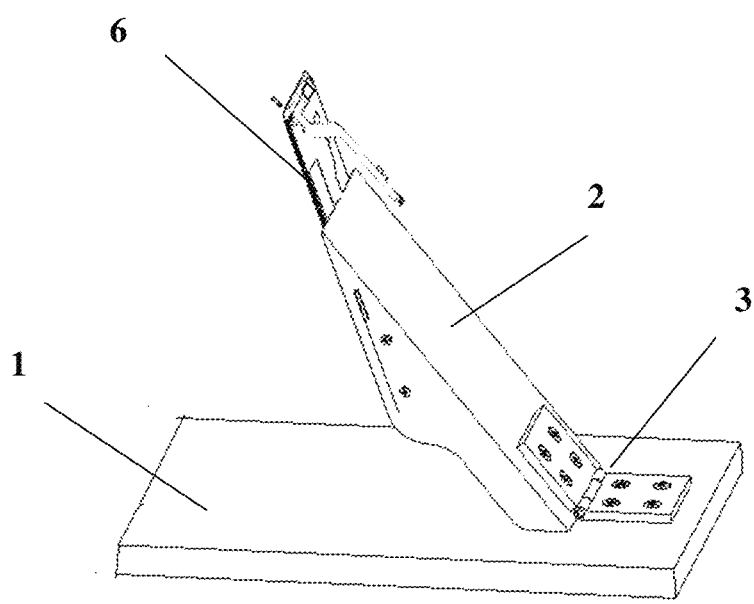
FIG. 5 is a schematic view showing the liquid crystal display module to be welded which is arranged on a supporter of the welding fixture shown in FIG. 1.
Figure 9:
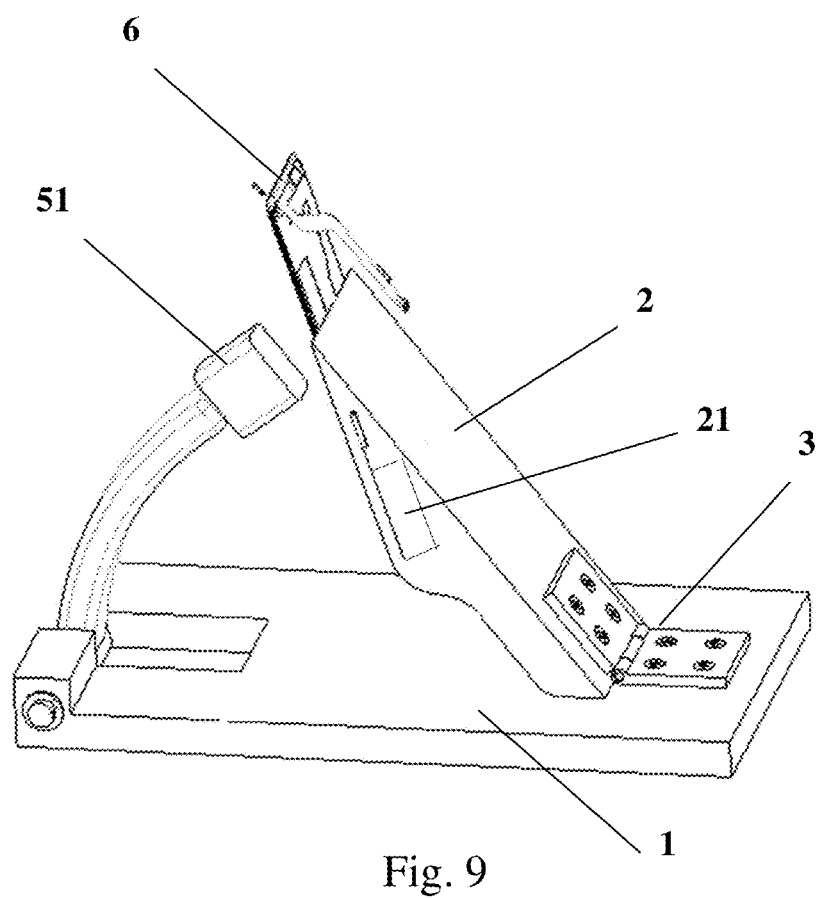
FIG. 9 is a schematic view showing that a liquid crystal display module to be welded is arranged on a supporter of the welding fixture shown in FIG. 7.
Figure 11:
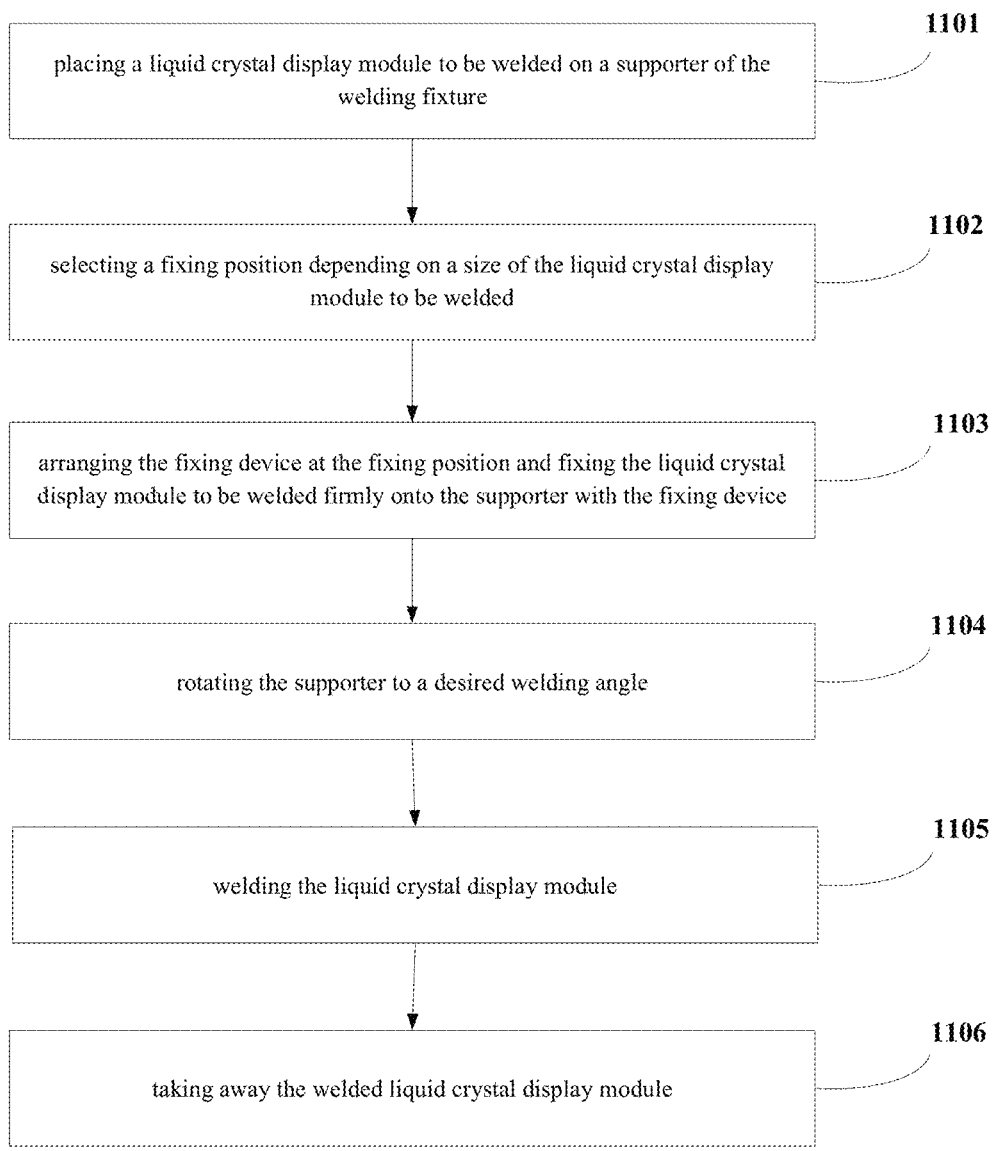
FIG. 11 is a flow chart showing a method for welding the liquid crystal display module using the welding fixture according to an embodiment of the present disclosure.

FIG. 11 shows a method for welding the liquid crystal display module using the welding fixture according to an embodiment of the present disclosure. As shown in FIG. 11, the method includes the steps of:

Step 1101: placing a liquid crystal display module to be welded on a supporter of the welding fixture, for example, FIG. 5 and FIG. 9 show states in which the liquid crystal display module 6 to be welded is placed on the supporter of the welding fixture according to embodiments of the present disclosure.

Step 1102: selecting a fixing position depending on a size of the liquid crystal display module to be welded.

Figure 6:
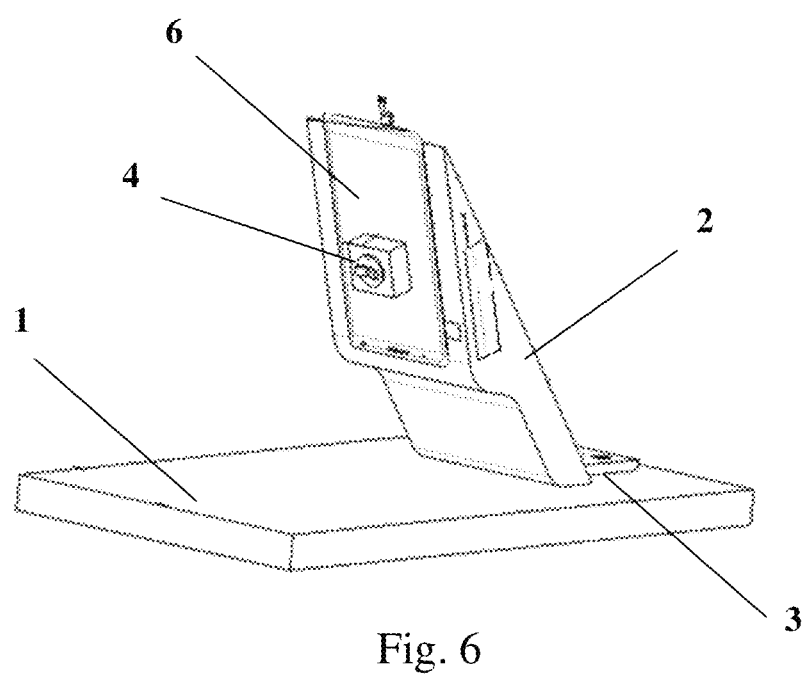
FIG. 6 is a schematic view showing the liquid crystal display module to be welded which is fixed on a supporter of the welding fixture shown in FIG. 1.
Figure 7:
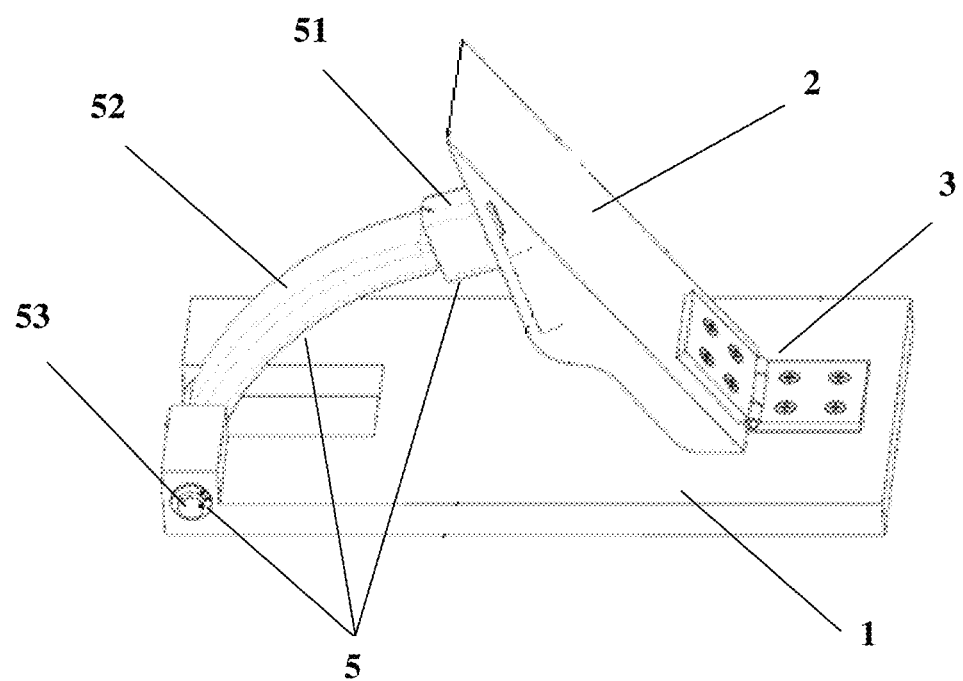
FIG. 7 is a perspective view showing a welding fixture according to another embodiment of the present disclosure.
Figure 8A:
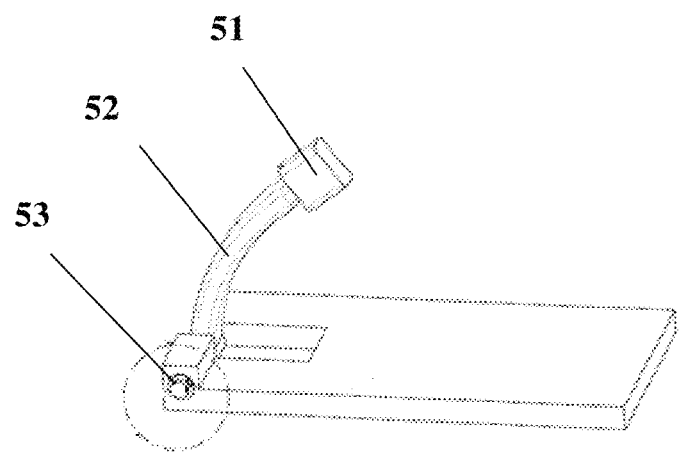
FIG. 8A shows the magnetic fixing device of the welding fixture shown in FIG. 7.
Figure 8B:
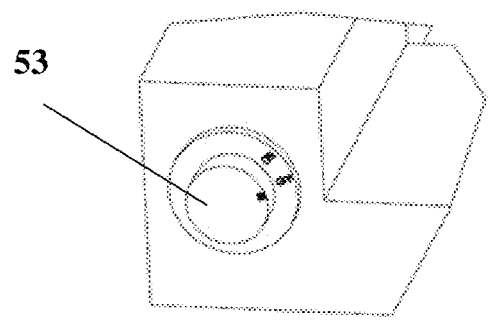
FIG. 8B shows a switch of the magnetic fixing device shown in FIG. 8A.
Figure 10:
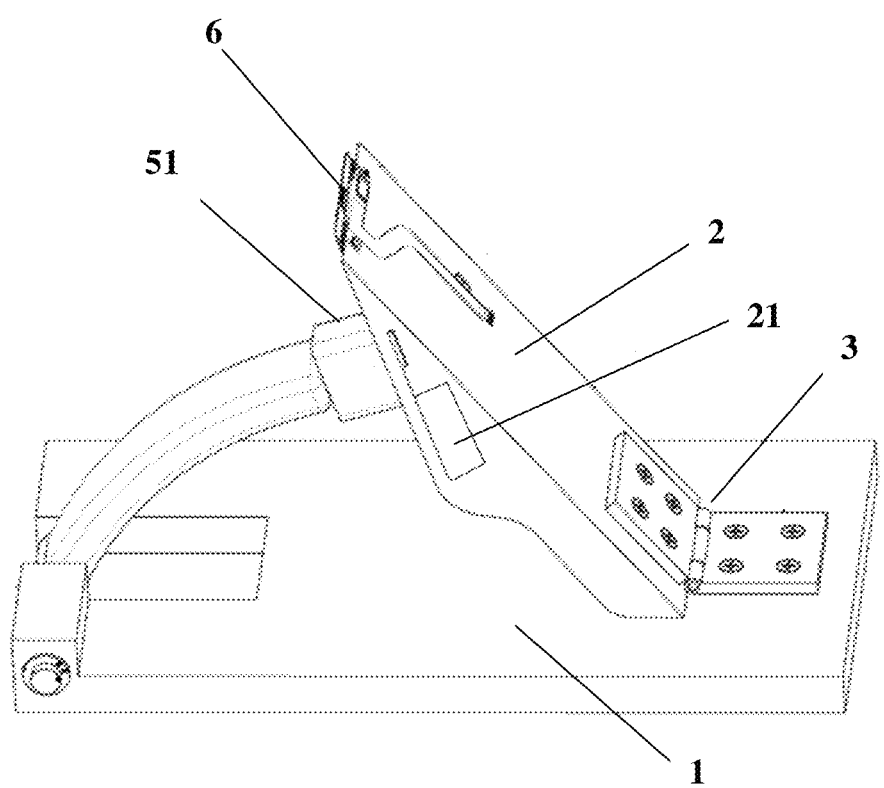
FIG. 10 is a schematic view showing that a liquid crystal display module to be welded is fixed on a supporter of the welding fixture shown in FIG. 7.

Step 1103: arranging the fixing device at the fixing position and fixing the liquid crystal display module to be welded firmly onto the supporter with the fixing device. FIG. 6 and FIG. 10 show states in which the liquid crystal display module 6 to be welded is placed on the supporter of the welding fixture according to embodiments of the present disclosure.

Step 1104: rotating the supporter to a desired welding angle. Since the damping hinge is used, the supporter may be rotated manually and may stop at any appropriate angles.

Step 1105: welding the liquid crystal display module.

Step 1106: taking away the welded liquid crystal display module.

In comparison with the prior art, the welding fixture and the method for welding the liquid crystal display module using the welding fixture according to the embodiments of the present disclosure at least have the following advantages: the supporter of the welding fixture may rotate with respect to the base and stop at any angles to be adapted to the welding angles of various types of the liquid crystal display module due to use of the damping hinge. In addition, various types of the liquid crystal display modules with different sizes may be pulled firmly onto the supporter by adjusting the position of the fixing device to fix the various types of the liquid crystal display modules. In this way, various types of the liquid crystal display modules may be welded with a universal welding fixture, so as to save the production costs of the liquid crystal display modules and reduce the production periods of the liquid crystal display modules.

The above described embodiments are exemplary embodiments of the present application, instead of limiting the present disclosure. All of modifications and alternatives made without departing from the principles and spirit of the disclosure should fall within the protection scope of the present disclosure. Therefore, the protection scope of the present application shall be defined by the appended claims.

What is claimed is:

1. A welding fixture for welding a liquid crystal display module, comprising:
   a base;
   a supporter arranged on the base;
   a fixing device arranged to fix a member to be welded on the supporter; and
   a damping hinge which comprises a first hinge plate, a second hinge plate and a pivot, the first hinge plate being fixed to the base, the second hinge plate being fixed to the supporter, wherein each of the first hinge plate and the second hinge plate has a pivot hole and is connected to the pivot via the pivot hole, and wherein the pivot is fitted into the pivot hole of each of the first hinge plate and the second hinge plate by interference;
   wherein the fixing device is a magnetic fixing device, and an iron member is provided in the supporter, and wherein the magnetic fixing device is arranged such that the magnetic fixing device is pulled firmly onto the iron member of the supporter by a magnetic force in a first state and the magnetic fixing device is disengaged from the iron member of the supporter by removing the magnetic force in a second state; and
   wherein the magnetic fixing device comprises a housing and a rotatable magnet arranged within the housing, the housing comprising two magnetic conductors and a copper plate arranged between the two magnetic conductors.

2. The welding fixture according to claim 1, wherein the magnetic fixing device further comprises a knob connected to the magnet to drive the magnet to rotate.

3. The welding fixture according to claim 1, wherein the magnetic fixing device comprises an electromagnet and a retractable shaft which has one end connected to the electromagnet and the other end connected to the base.

4. The welding fixture according to claim 3, wherein the magnetic fixing device further comprises a switch provided on the base and configured to control the electromagnet to be energized or de-energized.

5. A welding method using the welding fixture according to claim 1, the method comprising steps of:
   placing the member to be welded on the supporter of the welding fixture;
   positioning the member to be welded firmly onto the supporter;
   rotating the supporter to a desired welding angle;
   welding the member; and
   taking away the welded member.

6. The method according to claim 5, wherein the step of positioning the member to be welded firmly onto the supporter comprises:
   selecting a fixing position depending on a size of the member to be welded; and
   arranging the fixing device at the fixing position and fixing the member to be welded firmly onto the supporter with the fixing device.

\* \* \* \* \*